US010540304B2

(12) United States Patent
Sadowski et al.

(10) Patent No.: US 10,540,304 B2
(45) Date of Patent: Jan. 21, 2020

(54) POWER-ORIENTED BUS ENCODING FOR DATA TRANSMISSION

(71) Applicant: Advanced Micro Devices, Inc., Sunnyvale, CA (US)

(72) Inventors: Greg Sadowski, Cambridge, MA (US); Tri Minh Nguyen, Pflugerville, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 164 days.

(21) Appl. No.: 15/581,516

(22) Filed: Apr. 28, 2017

(65) Prior Publication Data

US 2018/0314655 A1 Nov. 1, 2018

(51) Int. Cl.
*G06F 13/16* (2006.01)
*G06F 13/40* (2006.01)

(52) U.S. Cl.
CPC ...... *G06F 13/1678* (2013.01); *G06F 13/4072* (2013.01)

(58) Field of Classification Search
CPC .................. G06F 13/1678; G06F 13/4072
See application file for complete search history.

(56) References Cited

U.S. PATENT DOCUMENTS

| | | | |
|---|---|---|---|
| 5,719,812 A | 2/1998 | Seki et al. | |
| 6,459,313 B1 | 10/2002 | Godbee et al. | |
| 6,584,526 B1 | 6/2003 | Bogin et al. | |
| 6,915,371 B1 | 7/2005 | Berndt et al. | |
| 7,495,587 B2 | 2/2009 | Bae | |
| 7,519,893 B2 | 4/2009 | Newcomb et al. | |
| 7,701,368 B2 | 4/2010 | Hollis | |
| 7,869,525 B2 | 1/2011 | Macri et al. | |
| 8,909,840 B2 | 12/2014 | Nygren et al. | |
| 9,170,301 B1 * | 10/2015 | Gallagher | G01R 31/31813 |
| 2002/0156953 A1 | 10/2002 | Beiley et al. | |
| 2003/0158981 A1 | 8/2003 | LaBerge | |
| 2003/0217243 A1 | 11/2003 | Chang | |
| 2004/0068594 A1 | 4/2004 | Asaro et al. | |
| 2005/0182894 A1 | 8/2005 | LaBerge | |

(Continued)

OTHER PUBLICATIONS

Hollis, Timothy M., "Data Bus Inversion in High-Speed Memory Applications," IEEE Transactions on Circuits and Systems II: Express Briefs, Apr. 2009, pp. 300-304, vol. 56, Issue 4.

(Continued)

*Primary Examiner* — Tim T Vo
*Assistant Examiner* — Herve Iradukunda
(74) *Attorney, Agent, or Firm* — Meyertons Hood Kivlin Kowert and Goetzel PC; Rory D. Rankin

(57) ABSTRACT

Systems, apparatuses, and methods for reducing the toggle rates on buses are disclosed. A computing system includes a source which provides packets for transmission on a bus. The packet is compressed by a compression engine. The compressed data format of the packet includes locations (bit positions) referred to as holes which do not include valid data. A bus configuration module identifies the locations of the holes and replaces the holes with information from a previous packet transmitted earlier on the bus. The bus configuration module also determines a new transmission bus width for the packet for lowering the bus toggle rate on the bus during transmission.

18 Claims, 10 Drawing Sheets

(56) References Cited

U.S. PATENT DOCUMENTS

| | | | |
|---|---|---|---|
| 2005/0283349 A1* | 12/2005 | Takemura | G06F 17/5022 |
| | | | 703/14 |
| 2006/0067313 A1* | 3/2006 | Bleisteiner | H04J 3/076 |
| | | | 370/389 |
| 2006/0184757 A1 | 8/2006 | Yeh et al. | |
| 2007/0180179 A1* | 8/2007 | Irisa | G06F 13/364 |
| | | | 710/307 |
| 2009/0174455 A1 | 7/2009 | Dimitriu et al. | |
| 2009/0313521 A1 | 12/2009 | Hollis | |
| 2010/0026533 A1 | 2/2010 | Hollis | |
| 2010/0077125 A1 | 3/2010 | Park et al. | |
| 2011/0252171 A1 | 10/2011 | Dearth et al. | |

OTHER PUBLICATIONS

International Search Report and Written Opinion in International Application No. PCT/US2012/070689, dated Jul. 19, 2013, 14 pages.

"Introduction to GDDR5 SGRAM", User's Manual E1600E10, Mar. 2010, 24 pages, vol. 1, Elpida Memory, Inc.

\* cited by examiner

POWER-ORIENTED BUS ENCODING FOR DATA TRANSMISSION

This invention was made with Government support under (FastForward-2 Memory Technology (MT) Project with Lawrence Livermore National Laboratory) Prime Contract No. DE-AC52-07NA27344, Subcontract No. B609201 awarded by the United States Department of Energy. The United States Government has certain rights in this invention.

BACKGROUND

Description of the Related Art

Semiconductor chips are often fabricated that include memory and one or more processors configured to process instructions. In some embodiments, the processors and the memory are on a same die. In other embodiments, the processing unit and the memory are on different dies within a same package such as a system-on-a-chip (SOC). In yet other embodiments, the processors and the memory are on different packages such as separate processing nodes. The instruction processing includes fetching instructions and data, decoding instructions, executing instructions, and storing results. Therefore, the one or more processors generate memory access requests for the fetching operations and the storing operations. These memory access requests and the corresponding responses are transferred over a variety of interconnects.

In addition to the above, the processors and various peripheral devices used in a system generate interrupts which are transferred via interconnects. In some embodiments, commands, coherency probes, and other communication messages are also transferred over the interconnections using either intra-chip or inter-chip communication. Examples of such interconnections in the system are bus architectures, crossbar-based architectures, network-on-chip (NoC) communication subsystems, communication channels between dies, silicon interposers used to stack chips side-by-side, through silicon vias (TSVs) used to vertically stack special-purpose dies on top of processor dies, and so on.

The power consumption of data movement over the variety of interconnections in a system typically increases as the amount of traffic increases in the system. For example, interconnect traffic grows as more processors and corresponding cores are added to the computing system. To increase effective bandwidth, data compression techniques are sometimes applied to the data that is being transferred on the interconnections. However, when data is compressed, portions of the interconnects (e.g., a bus) are not used to transmit valid data. For example, a packet with 64 bits of data may be generated for transmission on a 64 bit data bus. After compression, the 64 bits of data may be reduced to 42 bits of data. In such a case, the 64 bit packet now includes 42 bits of valid data and 22 bits of invalid (or "don't care") data. In these cases, the portions carrying the invalid bits of data may be set to a default value such as zero. These portions using the don't care or default values may be referred to as "holes". As such, a hole represents data that is not valid for the current packet. While these unused portions may not be carrying desired data, they nevertheless may cause unnecessary toggling on the corresponding wires which in turn increases power consumption.

Further, in various embodiments, the bus width of the various interconnections use a fixed width. The fixed widths may be determined based on matching the widths of interfaces to one another and/or to provide a target bandwidth. However, the total bus toggle rate, which includes the signal toggle rate and the coupling toggle rate, is dependent on the bus width. If the bus width increases to match the widths of other interfaces and provide a targeted bandwidth, then the bus toggle rate, and accordingly the power consumption, increases.

In view of the above, efficient methods and systems for reducing the toggle rates on buses are desired.

BRIEF DESCRIPTION OF THE DRAWINGS

The advantages of the methods and mechanisms described herein may be better understood by referring to the following description in conjunction with the accompanying drawings, in which.

Figure 1:
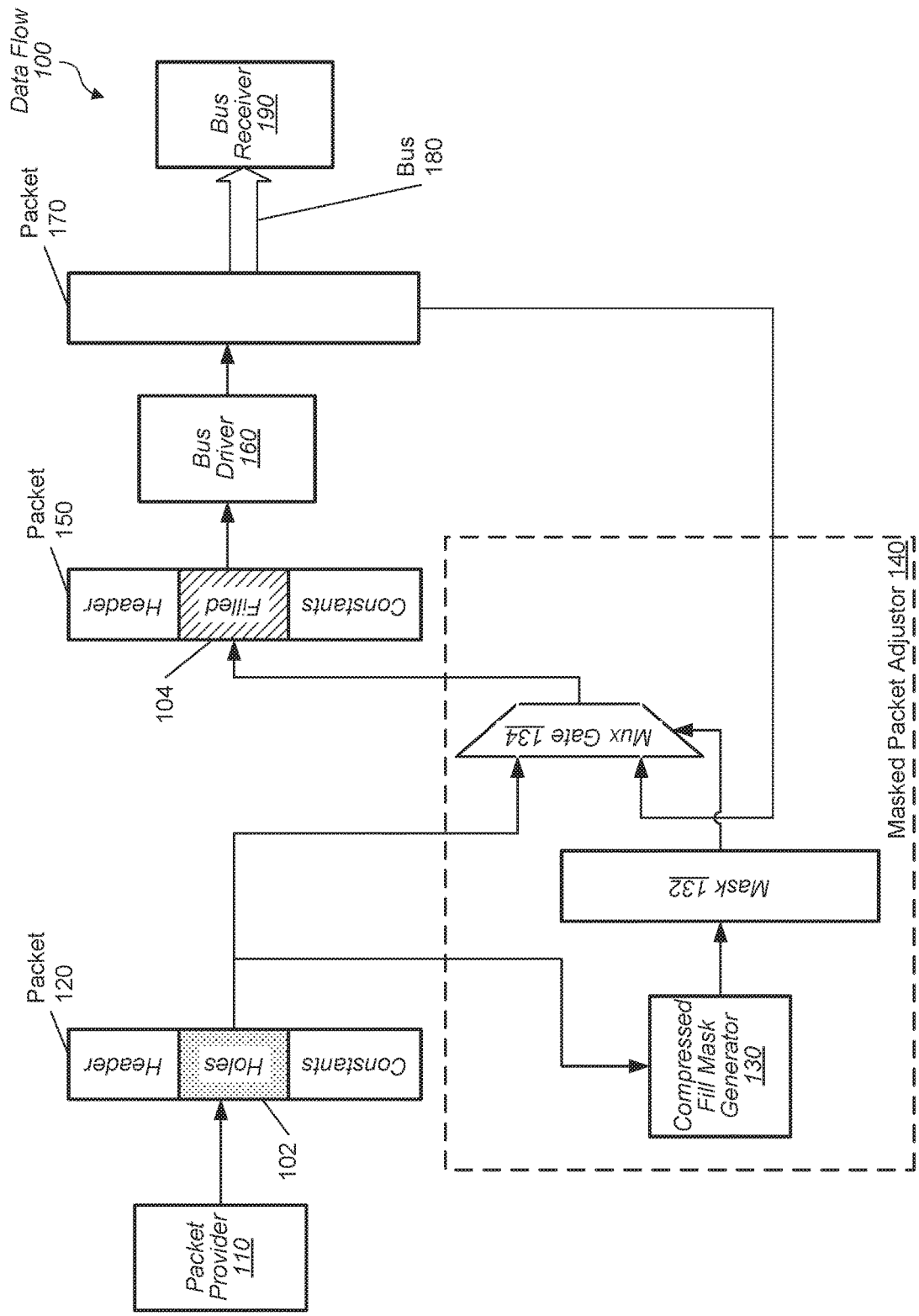
FIG. 1 is a block diagram of one embodiment of a data flow with reduced toggling on a bus.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for reducing the toggle rates on buses are disclosed. In various embodiments, a computing system includes a source which provides data for transmission on a bus or on a link. In one embodiment, the data for transmission is a network packet to be transmitted through resources shared by multiple sources, intermediate functional units and destinations. The shared resources include at least buses, bus drivers, bus receivers, routers, switches and so on. The network packet, which is also referred to as a "packet," includes a transmission header storing information identifying at least the source which generated the packet and the destination which intends to use the payload of the packet for processing an application. Therefore, the packet includes at least a header and a payload. The transmission header is used by routers, switches, and bus drivers to transmit the packet from the source to the destination.

In some embodiments, the packet is a flow control unit ("flit"). A flit is a subset of a larger packet. Flits generally carry data and control information, such as header and tail information for the larger packet. Although the data for transmission is described as packets routed in a network, in other embodiments, the data for transmission is a bit stream or a byte stream in a point-to-point interconnection.

In some embodiments, the source is a compression engine generating a compressed format of a received flit. In other embodiments, the source is an intermediate component between a source location and a destination for the flit used for routing the flit. In one embodiment, the intermediate component receives the flit after the flit has been compressed by the compression engine and routed by one or more other intermediate components. In yet other embodiments, the source is a source component originally generating the flit.

In some embodiments, the packet is compressed by a compression engine. Any one of a variety of compression techniques may be used. One example of a compression technique is the MPack data compression algorithm. Other techniques and algorithms are possible and are contemplated. In some embodiments, the compressed data format of the packet includes locations (bit positions) which are not filled with valid information (e.g., control and/or data information). For example, while the original packet may be filled with valid data, compression of the data may consume less than the entire packet. In such a case, the portions of the packet that do not store valid data may be referred to as "holes".

In various embodiments, holes in a current packet are replaced with information from a previous packet. For example, the holes are filled with the data of an immediately prior packet such that those particular data bits do not change between the prior packet and the current packet. In this manner, the bit positions corresponding to the holes do not toggle when the current packet is transmitted on the bus. Accordingly, the bus toggle rate reduces when the current packet is transmitted on the bus. In some embodiments, the bus configuration module identifies the locations of the holes from the compression header in the packet. The bus configuration module generates a mask or other identifiers identifying the locations of the holes. Using the mask or other identifiers, the bus configuration module replaces the holes with information from the previous packet.

In some embodiments, the bus configuration module receives the packet from the compression engine. If the packet was already compressed in an earlier routing stage, then the bus configuration module receives the packet from the packet provider. The bus configuration module determines a bus width for transmitting the first packet. In various embodiments, the determined bus width is smaller than a width of the bus to be used for transmitting. For example, in some embodiments, the bus has a width of 512 bytes and the compressed data format of the packet has a size of 256 bytes, but the bus configuration module determines a bus width of 64 bytes for transmission of the packet. In various embodiments, the bus configuration module determines the transmission bus width based on reducing the bus toggle rate which includes both the signal toggle rate and the coupling toggle rate.

In one embodiment, the bus configuration module receives one or more inputs used for determining the transmission bus width. In one embodiment, each of the size of the packet to transmit and the width of the bus to use for transmission are provided to the bus configuration module. In some embodiments, the bus configuration module uses the mask or other identifiers identifying the holes in the packet for determining the transmission bus width for the lowest bus toggle rate. In other embodiments, the bus configuration module receives hints from software regarding the data type used in a software application being processed. For example, when the data type is the floating-point data type and the values are similar in magnitude, the bus toggle rate is found to be the lowest when the transmission bus width is equal to the width of the floating-point format such as a 64-bit width for double precision floating point format. In other embodiments, a hardware monitor analyzes the data types used during the processing of threads, determines when a common data type is being used and notifies the bus configuration module of the common data type.

In yet other embodiments, the bus configuration module maintains a history of transmission bus widths and bus toggling rates, and selects a bus width with a lowest bus toggling rate at the time of selection. When the bus configuration module determines the size of the current packet is greater than the transmission bus width, the bus configuration module divides the current packet into multiple smaller portions, or "portions". Each portion has a size no greater than the transmission bus width. For example, for a packet with a size of 256 bytes, when the bus configuration module determines the transmission bus width is 64 bytes, the bus configuration module divides the packet into four portions, each with a size of 64 bytes.

In some embodiments, a transmission header is added to the current packet which increases the size of the portions. In such a case, more than four portions are transmitted on the bus, but each portion still has a size no greater than the determined transmission bus width of 64 bytes in order to reduce the bus toggle rate. One or more of the portions has holes of the original packet, and these locations with holes are replaced with data from the most recent packet transmitted on the bus prior to the current packet. In various embodiments, the computing system uses multiple bus configuration modules distributed throughout the system. As the data flows through routers, bus architectures, crossbar-based architectures, network-on-chip (NoC) communication subsystems, communication channels between dies, silicon interposers used to stack chips side-by-side, through silicon vias (TSVs) used to vertically stack special-purpose dies on top of processor dies, and so on, the bus configuration modules determine transmission bus widths for relatively low bus toggle rates while also replacing holes with previously transmitted data.

Referring now to FIG. 1, a block diagram of one embodiment of data flow 100 with reduced toggling on a bus is shown. In the illustrated embodiment, a packet provider 110 sends a packet 120, which is received by a masked packet adjustor 140. The masked packet adjustor 140 also receives information stored in a previous packet 170 for generating the current packet which is packet 150. The bus driver 160 receives the packet 150 for transmission on the bus 180. The bus receiver 190 receives packets transmitted on the bus 180. In some embodiments, packets are transmitted on the bus 180 at a rate of one packet per clock cycle (single data rate). In other embodiments, packets are transmitted on the bus 180 at a rate of two packets per clock cycle (double data rate). Other data rates are possible and contemplated for data flow 100 as well as for data flows 200 through 700, which are described later. The components 110 to 190 are used in a network switch, a router, an on-chip interconnection network in a computing system, or otherwise.

In some embodiments, the packet to be transmitted on the bus 180 is application data and the packet provider 110 is external (off-chip) memory, one of the multiple levels of a hierarchical cache memory subsystem, a display controller, a camera subsystem, microphone, or any of a variety of other devices. In other embodiments, the packet to be transmitted on the bus 180 is result data and the packet provider 110 is a processor generating the result data. In yet other embodiments, the packet provider 110 is a component within an input/output (I/O) controller such as an analog-to-digital converter (ADC), output buffers following one or more of storage elements and multiplexing selection logic, and so forth.

In still other embodiments, the packet provider 110 is a compression engine generating a compressed format of a received packet. Any one of a variety of compression techniques is used such as the MPack data compression algorithm. Other techniques and algorithms are possible and contemplated. In still further embodiments, the packet provider 110 is an intermediate component between a source location and a destination for the packet used for routing the packet. In various embodiments, the intermediate component receives the packet after the packet has been compressed by the compression engine and routed by one or more other prior intermediate components.

In various embodiments, the packet 120 includes at least a header. The header indicates whether the packet 120 has been compressed. If so, in some embodiments, the header also indicates a number of 32-bit constants, a number of 16-bit constants and any other type and number of other constants generated by the compression engine. Additionally, in various embodiments, the header indicates locations (bit positions) within the packet 120 that are not filled with new information—such as the compressed data output from the compression engine. While these locations that do not include new information may include data, the data that is included there is not valid data for the current packet. As mentioned above, these locations that do not include new data may be referred to as "holes" (e.g., see holes 102 in packet 120 in FIG. 1). In various embodiments, the invalid data used for the holes 102 are default values determined by designers (e.g., these values may default to all zeroes). As shown, packet 120 includes a header region, a region for holes 102, and a constants region. It is noted that while packet 120 is shown with a single region for holes 102, it is possible that there may be multiple regions of holes separated by valid data. In some embodiments, the header indicates beginning and ending bit positions of any holes within the packet 120. In other embodiments, the header indicates a start bit position and a size of the region with holes 102 within the packet 120. Other ways for indicating the locations of the holes are also possible and contemplated.

As shown in FIG. 1, the bus driver 160 does not receive the packet 120. Rather, the masked packet adjustor 140 receives the packet 120 and provides the packet 150 for the bus driver 160. In one embodiment, the masked packet adjustor 140 uses a compressed fill mask generator (CFMG) 130 for analyzing the header of the packet 120 and generating the mask 132 which indicates the locations of the holes within the packet 120. In some embodiments, the CFMG 130 uses one of the above examples of information in the header for indicating the locations of the holes. In other embodiments, the CFMG 130 uses the size of the packet 120, the size of the header, and the number of constants and their respective sizes to determine the size of the region with holes. In addition, the predetermined layout of the packet 120 is used to determine the locations of the holes and generate the mask 132.

The CFMG 130 receives information from the previous packet 170, which is the most recent packet transmitted on the bus 180 prior to the current packet 120. In some embodiments, the CFMG 130 receives all of the information within the previous packet 170. In other embodiments, a subset of the information within the previous packet 170 is sent to the CFMG 130, such as the data in the locations identified storing the holes in the packet 120. The multiplexer (mux) gate 134 uses the mask 132 for selecting between information stored in the current packet 120 and information stored in the previous packet 170 to form the new packet 150. For example, the mux gate 134 selects the information stored in the packet 120 for regions outside of the region identified for the holes 102, and selects the information stored in the packet 170 as the filled data 104 for the region identified previously for the holes 102. The output is conveyed as the packet 150.

As the packet 150 uses the information stored in the previous packet 170 in the region for filled data 104 which was previously identified as the region for the holes 102, this region does not toggle. In other words, that portion of the bus remains unchanged between the prior packet and the current packet. Therefore, the region with the filled data 104 does not toggle for the transmission of packet 150 which occurs after the transmission of the previous packet 170. Accordingly, the bus toggle rate for the bus 180 is reduced. The bus 180 is any one of a variety of buses used in a computing system. Examples of the bus 180 are a system bus between a processor and memory, a direct memory access bus, a local bus directly connecting peripheral devices to one or more processors, an external or expansion bus for connecting expansion memory and other peripheral devices to one or more processors, and so on. The bus 180 is used in any of a variety of communication systems such as routers, bus architectures, crossbar-based architectures, network-on-chip (NoC) communication subsystems, communication channels between dies, silicon interposers used to stack chips side-by-side, through silicon vias (TSVs) used to vertically stack special-purpose dies on top of processor dies, and so on.

The bus driver 160 is one of a variety of data drivers using stand-alone buffers or buffers within storage elements to drive data over the bus 180. Each of the bus driver 160 and the bus receiver 190 uses queues for storing data, such as packets, and control logic for supporting one or more communication protocols and synchronizing different operational clock frequencies.

Although the data for transmission in the above descriptions are packets routed in a network, in other embodiments, the data for transmission is a bit stream or a byte stream in a point-to-point interconnection. In such embodiments, a data provider is used in place of the packet provider 110 where the data provider generates data for transmission on the bus 180. The bus driver 160 and the bus receiver 190 are replaced with a data driver and a data receiver as the interconnection is a point-to-point interconnection, and thus, a transmission header with source information, destination information and routing information is not used. Accordingly, control logic for generating and analyzing this information in a transmission header is not used in either of the data driver or the data receiver. However, an indication of the locations of the holes being transmitted with the data is provided on the bus. The data driver transmits this indication and the data receiver uses this indication for locating the new data which is received and for assembling data from multiple received portions. Dividing packets or data for transmission into portions is described next in the below description.

Figure 2:
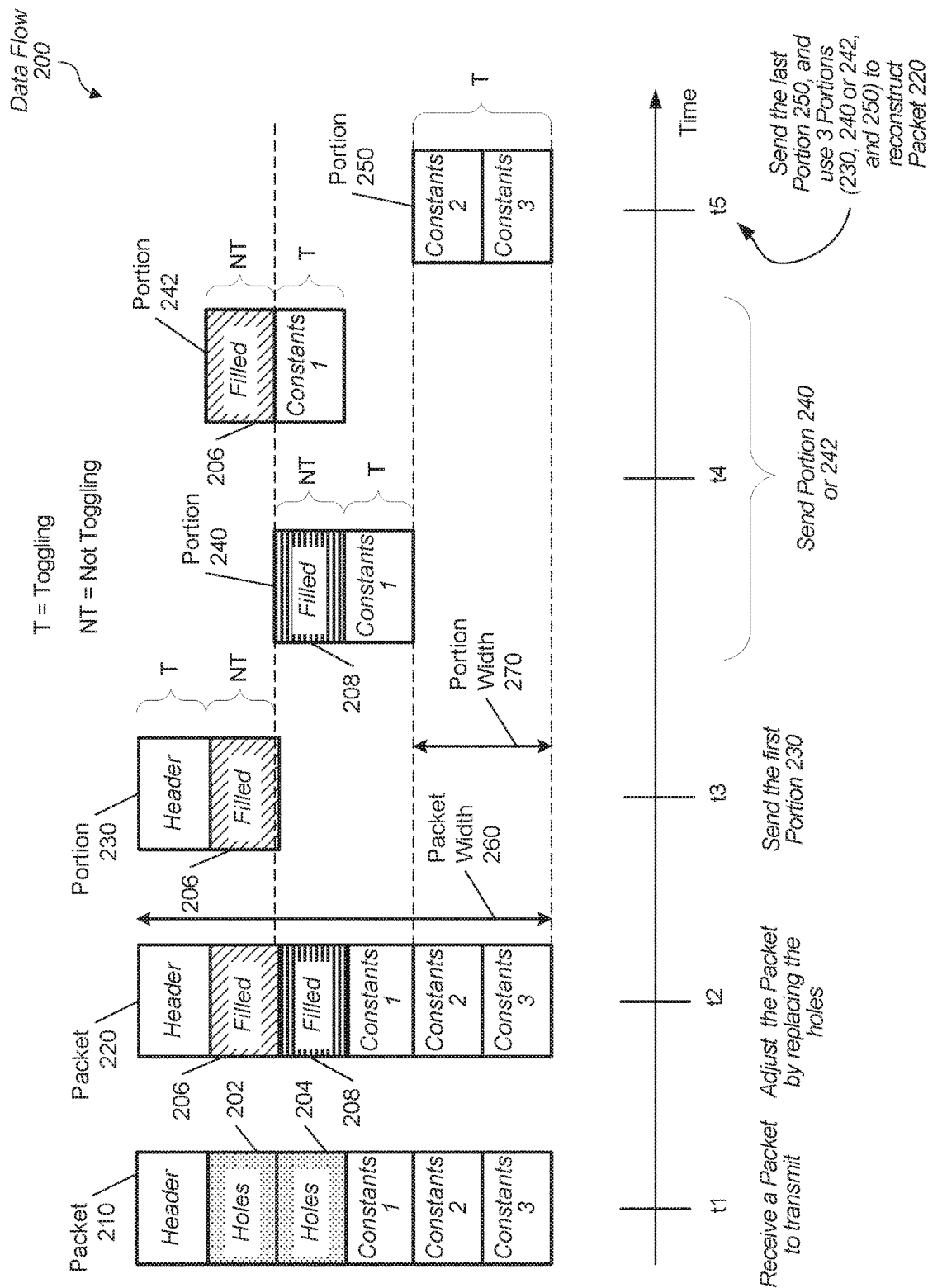
FIG. 2 is a block diagram of another embodiment of a data flow with reduced toggling on a bus.

Turning now to FIG. 2, a block diagram of another embodiment of data flow 200 with reduced toggling on a bus is shown. As shown, a sequence of steps occur over time, such as times t1 to t5. At time t1, the packet 210 is received for transmission on a bus. As shown, the packet 210 includes a region for holes 202 and a region for holes 204. The holes 202 and the holes 204 are not filled with any new information by the compression engine as described earlier. Rather the holes 202 and 204 are invalid data, and in some embodiments, they are default values determined by designers. At time t2, to create the packet 220, the holes 202 and the holes 204 in packet 210 are replaced/filled with information from the packet (not shown) sent immediately prior to the packet 210. The packet 220 includes the filled data 206 and the filled data 208 in place of the holes 202 and the holes 204, respectively. In various embodiments, packet 210 includes different data in one or more regions than the packet sent immediately prior to the packet 210 (i.e., packet 210 is not identical to the previous packet). In the example shown, the filled data 206 and the filled data 208 are shown with different shading as they may store different information compared to one another. As described later, the information stored in the filled data 206 and the filled data 208 is taken from the same (corresponding) locations in the immediately preceding packet.

In the example shown, packet 220 is shown to have a packet width 260. In the illustrated embodiment, the packet width 260 is the same as the total transmission bus width. However, in other embodiments, the packet width may be larger than the total transmission bus width and the packet is divided into two or more portions before being sent. In various embodiments, the bus toggle rate includes both the signal toggle rate and the coupling toggle rate. The bus toggle rate is dependent on the width of data transmitted on the bus and the type of workload. For example, in some embodiments, designers may run predetermined applications and/or workloads in a simulated or real environment to find the bus toggle rates when using different bus widths (e.g., from 32 bytes to 256 bytes). Various benchmark workloads such as CoMD, lulesh, miniMD, XSBench, astar, bzip2, and so on, may also be run and characterized based on varying bus widths. Based on these tests, certain bus widths may show lower overall power consumption than other bus widths for a particular application or workload. For example, given the type of data being processed, the tests may reveal that using a bus width equal to one quarter of the bus width uses less power overall than packets of larger sizes—despite the fact that more of these smaller packets must be conveyed. In such a case, the packet size used to transmit the data may be chosen to be equal to one quarter of the bus width. In various embodiments, data correlating bus widths to various types of applications and/or workloads and corresponding power consumption is stored (e.g., in a table or otherwise). In the illustrated embodiment, the portion width 270 is determined to be a transmission bus width with the lowest (or lower than full packet size) bus toggle rate for the current workload based on one or more factors. Therefore, the packet 220 is divided into portions, each portion having a portion width 270 rather than the packet width 260.

When the packet 220 is divided into portions, a variety of factors are used to determine the portion width 270. One example of a factor is a hint from software or hardware indicating the data or application type used in the workload being processed. This hint may be used to reference previously stored test data (e.g., the table noted above) to identify the bus width and corresponding packet size to be used. Another example is a mask, or other identifiers, that identify the holes 202 and the holes 204 in the packet 210, or similarly, the filled data 206 and the filled data 208 in the packet 220. Yet another example is a maintained history of transmission bus widths and bus toggling rates, so a bus width with the lowest bus toggling rate at the time of selection is chosen.

At time t3, the first portion, which is portion 230, is sent over the bus. In some embodiments, a different transmission header is used to indicate that portion 230 is not a complete packet, but it depends on other portions for later reconstruction. The filled data 206 in the portion 230 occupies the same region that the previous packet used for the same data. Therefore, no toggling occurs in this region when the portion 230 is transmitted on the bus. As shown, the portion 230 has a width less than the packet width 260. In various embodiments, the portion 230 has a width equal to the portion width 270. In an embodiment in which the portion 230 has a width that is less than the width of the transmission bus, the remainder of the bus is filled with data from a previously sent packet or portion. Therefore, no bus toggling occurs outside of the region for the header in the portion 230. In other embodiments, the remainder of the bus is filled with a default value such as zero. In yet other embodiments, the remainder of the bus is left floating as it is not driven to a particular value. For example, a tristate driver may be used for the remainder of the bus. At time t4, in some embodiments, the portion 240 is sent on the bus after the portion 230. In other embodiments, the portion 242 is sent.

For each of the portion 240 and the portion 242, there is a region occupying the same locations on the bus with the same data as the previously sent packet. For example, portion 240 uses the filled data 208. As no new data was sent on the bus in this region when the portion 230 was sent at time t3, the data is still available on the bus lines and no toggling occurs in this region when the portion 240 is sent at time t4. Similarly, portion 242 uses the filled data 206 which was previously used in the portion 230 and the previous packet. Therefore, no toggling occurs in this region if the portion 242 is transmitted on the bus. In various embodiments, the choice as to which filled region to combine with the constants is a matter of design choice.

As can be seen in the illustrated embodiment, the portion 240 has the filled data 208 and the Constants 1 region in the same locations as the packet 220. Therefore, no multiplexing is used to send these regions within the portion 240. The portion 242 has the filled data 206 in the same location as the packet 220, but the Constants 1 region is in a different location than was used by the packet 220. Therefore, multiplexing is used to send the Constants 1 region in the portion 242 in the illustrated embodiment. In other embodiments, the portion 242 has the Constants 1 region in the same location as the packet 220, and the portion 242 does not use contiguous interconnect lines on the transmission bus.

Therefore, no multiplexing is used to send these regions within this variation of the portion 242. The selection for using the portion 240, the portion 242 or a variation of the portions 240 or 242 is based on design choice. For example, as described earlier, designers in a simulation or real environment may determine the bus toggle rate varies for bus widths and the type of workload. In addition, the placement of the toggling data can affect the coupling toggle rate of the total bus rate. Therefore, in some embodiments, the designers can design the control logic to select where on the bus to place data to be sent. In other embodiments, the control logic sends the data on the bus in the same location as the data occupies in the packet to be sent.

Similar to portion 230, each of the portion 240 and the portion 242 has a width smaller than the total packet width 260. As noted above, in embodiments where portions 240 and 242 have a width less than the width of the transmission bus, the remainder of the bus is filled with data from a previously sent packet or portion. Therefore, no bus toggling occurs outside of the region for the Constants 1 in either of the portion 240 or the portion 242. At time t5, the portion 250 is sent over the bus. Here, each of the regions for Constants 1 and Constants 2 toggle on the bus, but portion 250 uses the portion width 270 which is smaller than the packet width 260. Again, in an embodiment, the remainder of the transmission bus is filled with data from a previously sent packet or portion. Therefore, no bus toggling occurs outside of the regions for the Constants 2 and Constants 3 in the portion 250. Therefore, the total bus toggling rate is lower.

When the portion 250 is received at the bus receiver, the transmitted portions 230, 240 or 242, and 250 are used to reconstruct the packet 220. In various embodiments, information in one or more of the headers for the portions sent across the bus is used for the reconstruction. Although a separate header is not shown for portions 240 or 242 and portion 250, in some embodiments, a transmission header is included in these portions. Similarly, a transmission header is included along with the compression header in portion 230. If the transmission header is sufficiently large, then the amount of data in the portions and/or the number of portions is adjusted accordingly.

Figure 3:
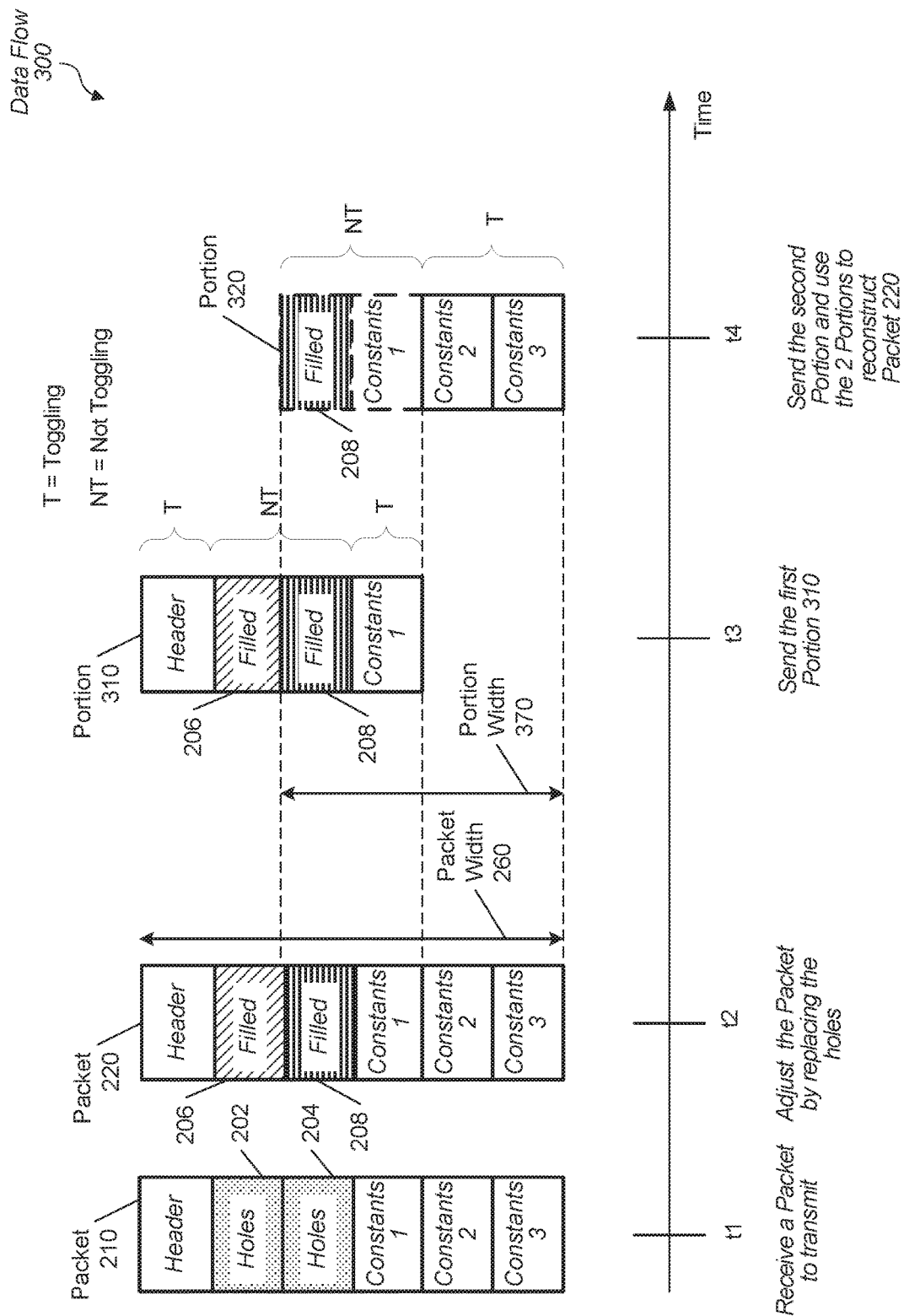
FIG. 3 is a block diagram of another embodiment of a data flow with reduced toggling on a bus.

Turning now to FIG. 3, a block diagram of another embodiment of data flow 300 with reduced toggling on a bus is shown. Again, a sequence of steps are shown to occur over time, such as times t1 to t4. Components described earlier are numbered identically. The same steps at time t1 and t2 used in the earlier description for data flow 200 are repeated here. However, in this embodiment, the transmission bus width is the portion width 370 as determined by the lowest bus toggle rate for the current workload based on one or more factors. As shown, the portion width 370 is the size of four regions. For data flow 300, at time t3, the portion 310 is sent on the bus. As the filled data 206 and the filled data 208 are known not to toggle, the actual width corresponding to toggling data on the bus, which includes the widths of the regions for the Header and Constants 1, add up to the width of two regions. In this case, the portion width 370 is smaller than the packet width 260, and further, the actual width corresponding to toggling data is even smaller than the portion width 370. Therefore, the total bus toggling rate is significantly lower than if the entire bus width 260 used toggling data during data transmission.

As the portion 310 has a width that is less than the width of the transmission bus, in an embodiment, the remainder of the bus is filled with data from a previously sent packet or portion. Therefore, no bus toggling occurs outside of the region for the portion 310. In other embodiments, the remainder of the bus is filled with a default value such as zero. In yet other embodiments, the remainder of the bus is left floating as it is not driven to a particular value. For example, a tristate driver is used. At time t4, the portion 320 is sent on the bus. The widths of the regions for the Constants 2 and Constants 3 add up to the width of two regions. In some embodiments, only the regions for Constants 2 and Constants 3 are sent on the bus. In other embodiments, the regions for filled data 208 and Constants 1 are also sent as these regions do not toggle. The data in these regions are the same as the data sent in the previous portion 310 and this data is used to fill the filled data 208 and the region for Constants 1. Similar to when portion 310 was sent, the actual width corresponding to toggling data for portion 320 is even smaller than the portion width 370. Therefore, the total bus toggling rate is lower than if the entire bus width 260 used toggling data during data transmission.

When the portion 320 is received at the bus receiver, the transmitted portions 310 and 320 are used to reconstruct the packet 220. In various embodiments, information in one or more of the headers for the portions sent across the bus is used for the reconstruction. Although a separate header is not shown for portion 320, in some embodiments, a transmission header is included in this portion. Similarly, a transmission header is included along with the compression header in portion 310. If the transmission header is sufficiently large, then the amount of data in the portions and/or the number of portions is adjusted accordingly.

Figure 4:
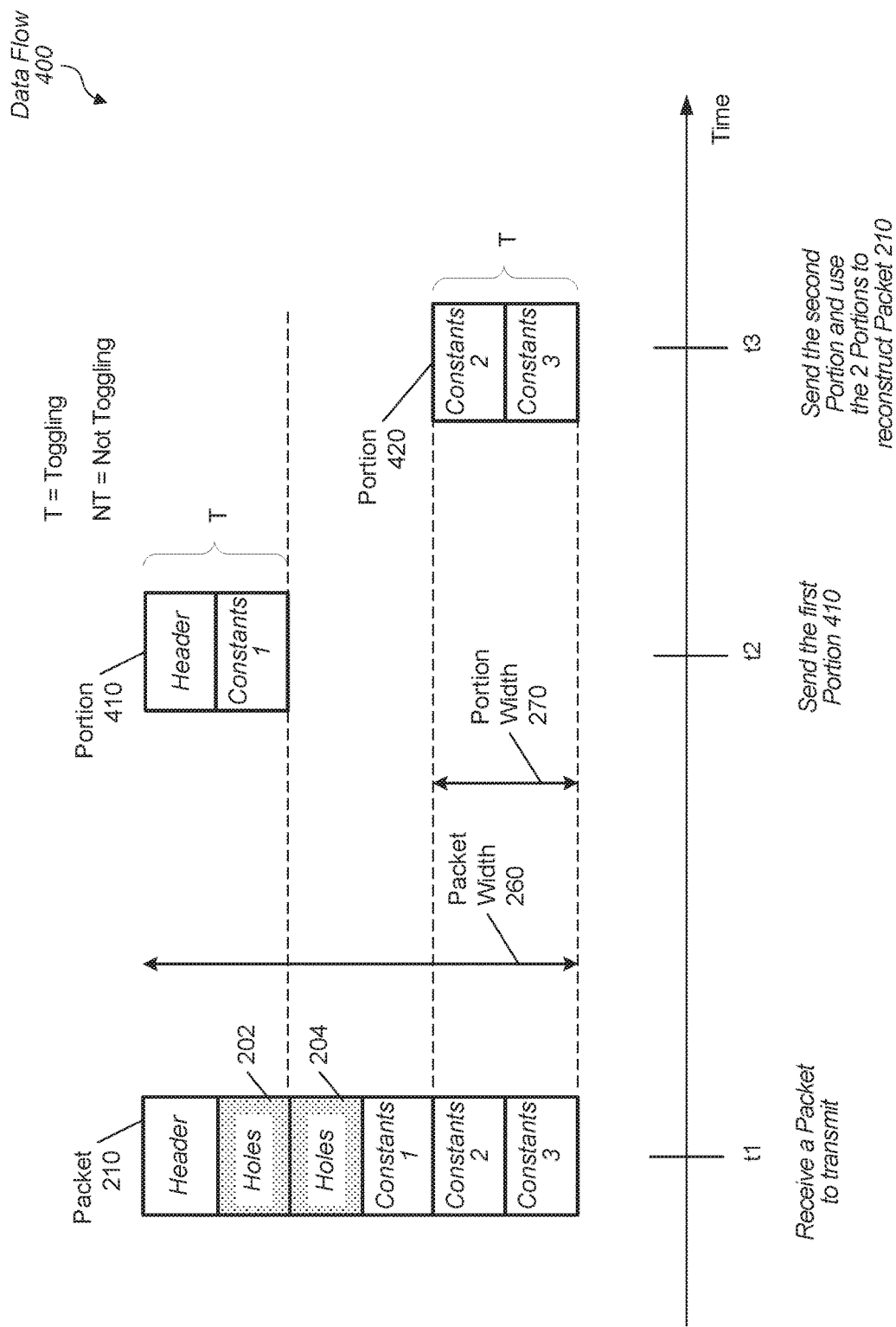
FIG. 4 is a block diagram of another embodiment of a data flow with reduced toggling on a bus.

Turning now to FIG. 4, a block diagram of another embodiment of data flow 400 with reduced toggling on a bus is shown. Again, a sequence of steps are shown to occur over time, such as times t1 to t3. Components described earlier are numbered identically. At time t1, the packet 210 is received for transmitting on a bus. As shown, the packet 210 includes the holes 202 and the holes 204. Here, however, the holes 202 and the holes 204 are not replaced. The portion width 270 is determined to be a transmission bus width with the lowest bus toggle rate for the current workload based on one or more factors.

At time t2, the first portion 410 is sent on the bus. Portion 410 uses the regions for the Header and Constants 1. The widths for these regions are determined to add up to the determined portion width 270. The holes 202 and the holes 204 are not sent on the bus as they are known not to include information to be used later. At time t3, the portion 420 is sent on the bus. The widths of the regions for the Constants 2 and Constants 3 in portion 420 are determined to add up to the determined portion width 270.

When the portion 420 is received at the bus receiver, the transmitted portions 410 and 420 are used to reconstruct the packet 210. In some embodiments, the regions for the holes 202 and the holes 204 are filled with previous data or a constant value. If a constant value is used, then the regions for the holes 202 and the holes 204 are filled with previous data during a subsequent transmission on a next bus. In various embodiments, information in one or more of the headers for the portions sent across the bus is used for the reconstruction of packet 210. Although a separate header is not shown for portion 420, in some embodiments, a transmission header is included in this portion. Similarly, a transmission header is included along with the compression header in portion 410. If the transmission header is sufficiently large, then the amount of data in the portions and/or the number of portions is adjusted accordingly.

It is noted for each of the previous data flows 200 and 300 in addition to the present data flow 400, data from multiple packets are transmitted simultaneously in various embodiments. For example, taking the present data flow 400 as an example, the packet 210 corresponds to a particular word, which is referred to as Word 1, requested by a particular thread. Another packet (not shown) corresponds to another word being requested which is referred to as Word 2. Each of the packets for Word 1 and Word 2 have any holes identified and have transmission bus widths determined.

As shown at time t2 in the illustrated embodiment, much of the bus is not used when transmitting portion 410, which is used for Word 1. In an embodiment, some of the remaining bus width is used to send a portion for Word 2. Therefore, the throughput increases for data transmission on the bus as the latencies are hidden with the overlapped transmission. In an embodiment, data is sent in an overlapped similar manner for the data flows 200 and 300 described earlier.

Figure 5:
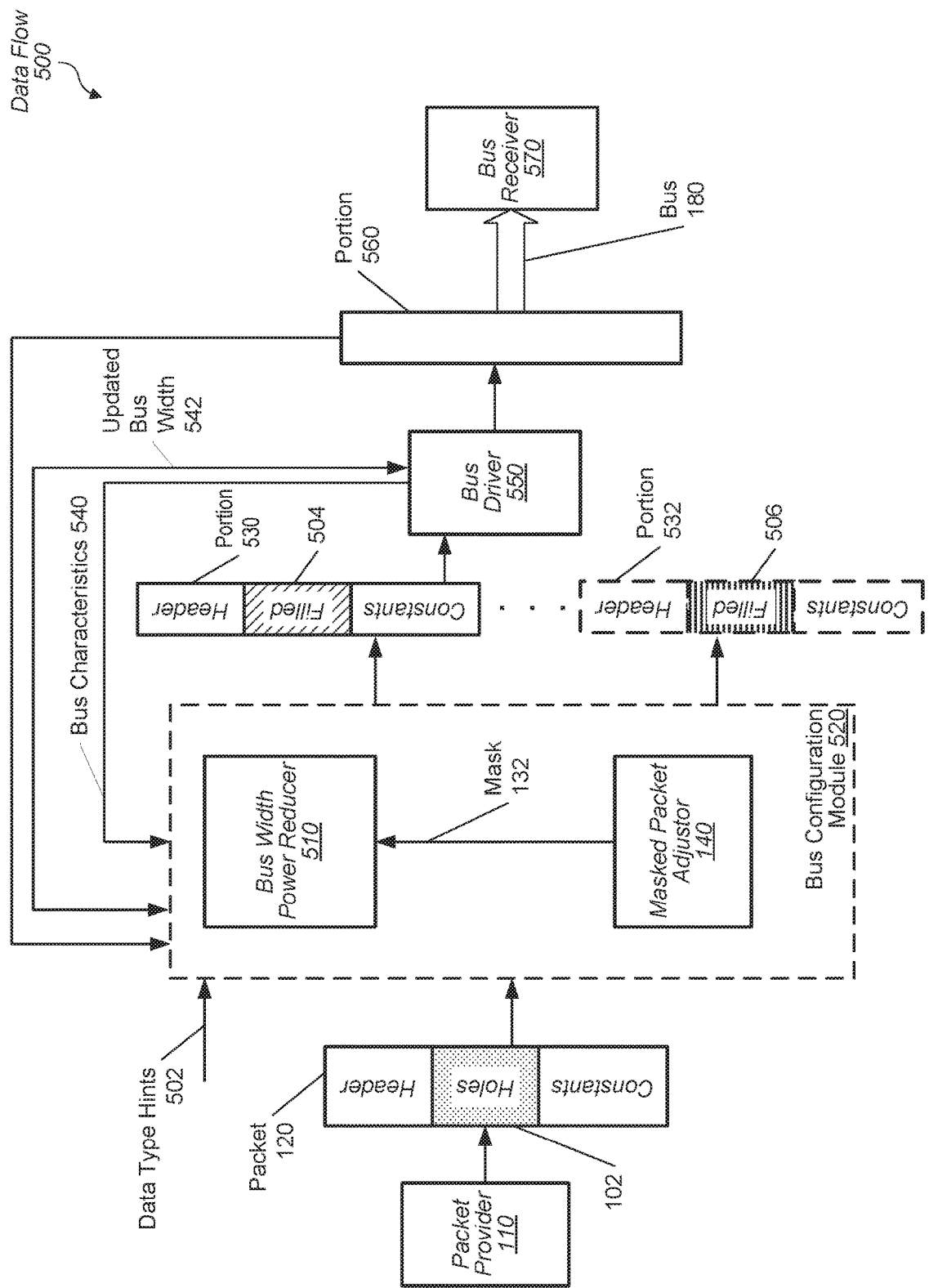
FIG. 5 is a block diagram of another embodiment of a data flow with reduced toggling on a bus.

Referring to FIG. 5, a block diagram of another embodiment of data flow 500 with reduced toggling on a bus is shown. Components and control logic described earlier are numbered identically. As shown, a packet provider 110 sends a packet 120, which is received by a bus configuration module 520. The bus configuration module 520 receives data type hints 502 indicating a type of data being processed in a current workload, information stored in a previous packet or portion 560 for generating the current packet or portions 530-532, and bus characteristics 540 from the bus driver 550. As described earlier, packet 120 includes a header region, a region for holes 102, and a constants region. As shown, portion 530 includes a header region, a region for the filled data 504, and a constants region while portion 532 includes a header region, a region for the filled data 506, and a constants region. The bus receiver 570 receives data transmitted on the bus 180 by the bus driver 550. The components in the illustrated embodiments are used in a network switch, a router, an on-chip interconnection network in a computing system, or otherwise.

The bus configuration module 520 uses the masked packet adjustor 140 and additionally a bus width power reduce 510. As described earlier, the masked packet adjustor 140 generates the mask 132 which indicates the locations of the holes within the packet 120. The bus width power reducer 510 determines a transmission bus width with the lowest bus toggle rate for the current workload based on one or more factors. In various embodiments, the one or more factors described earlier for the data flow 200 in FIG. 2 are used. Accordingly, the bus width power reducer 510 receives the data type hints 502 and the bus characteristics 540.

The data type hints 502 are from software, a hardware monitor or a combination. The bus characteristics 540 indicates the type of medium used for transferring data such as a bus architecture, a crossbar-based architecture, a network-on-chip (NoC) communication subsystem, a silicon interposers, a through silicon via (TSV) in a three-dimensional (3D) integrated circuit (IC), or otherwise. In some embodiments, the bus characteristics 540 are not sent to the bus configuration module 520, but the bus characteristics 540 are programmed in configuration and status registers within the bus configuration module 520 or programmed in tables used to model the relationship between workloads and bus widths. The bus width power reducer 510 additionally receives the mask 132 for determining the transmission bus width for the packet 120.

When the determined transmission bus width is smaller than the width of the packet 120, the packet 120 is divided into portions, each with a size less than or equal to the determined transmission bus width. As shown, the packet 120 is divided into portions 530 and 532. Although two portions are shown, any number of portions are possible for dividing the packet 120. When the determined transmission bus width is equal to or larger than the width of the packet 120, the packet 120 is not divided into portions. The determined transmission bus width for the packet 120 is sent as the updated bus width 542 to the bus driver 550. The portion 560 is one of the portions 530-532. The bus receiver 570 receives the portion 560 sent on the bus 180.

When the last portion of the portions 530-532 is received at the bus receiver 570, the transmitted portions 530-532 are used to reconstruct the packet 120 although possibly with different information in the region for the holes. In various embodiments, information in one or more of the headers for the portions 530-532 sent across the bus 180 is used for the reconstruction.

Figure 6:
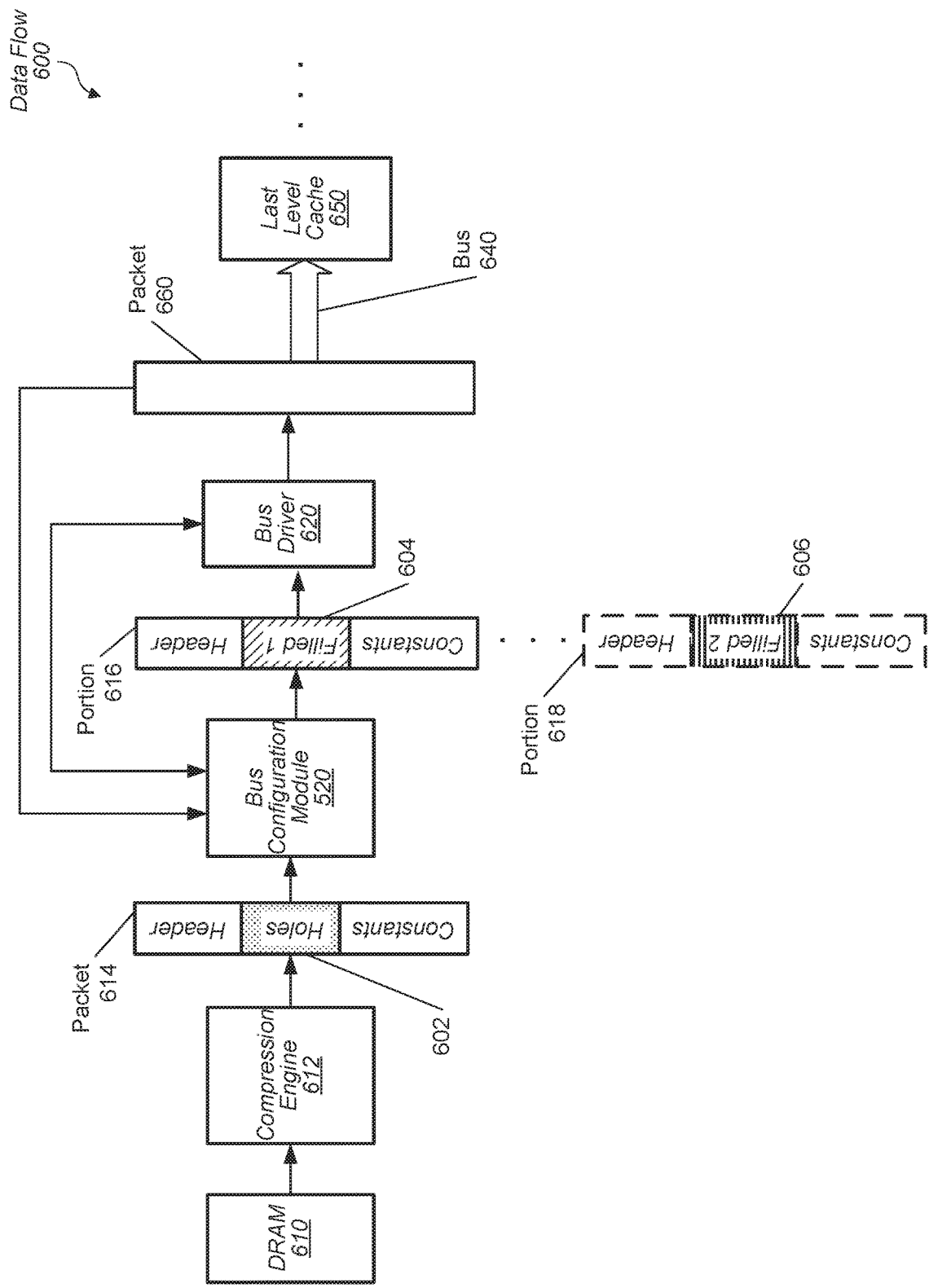
FIG. 6 is a block diagram of another embodiment of a data flow with reduced toggling on a bus.

Referring to FIG. 6, a block diagram of another embodiment of data flow 600 with reduced toggling on a bus is shown. Components and control logic described earlier are numbered identically. In the illustrated embodiment, information is being retrieved from system memory, such as DRAM 610 and transmitted to the last level cache 650. As shown, packet 614 includes a header region, a region for holes 602, and a constants region. Portion 616 includes a header region, a region for the filled data 604, and a constants region while portion 618 includes a header region, a region for the filled data 606, and a constants region. As described earlier, the transmission of data from the DRAM 610 to the last level cache 650 uses one or more of a bus architecture, a crossbar-based architecture, a network-on-chip (NoC) communication subsystem, a silicon interposer, a TSV in a 3D IC, and so on.

The requested data retrieved from the DRAM 610 is compressed by any one of data compression algorithms by the compression engine 612. The resulting compressed data is sent as the packet 614 to the bus configuration module 520. As described earlier, the bus configuration module 520 identifies the locations of the regions with the holes 602 within the packet 614 and also determines a transmission bus width with the lowest bus toggle rate for the current workload based on one or more factors. If the packet 614 is divided into portions, the resulting portions 616 and 618 are sent to the bus driver 620. Although two portions are shown, any number of portions is possible for dividing the packet 614. The bus driver 620 sends either the undivided packet 614 or the portions 616-618 on the bus 640 to the last level cache 650. If the portions 616-618 are sent, reconstruction of the packet 614 from the portions 616-618 occurs in the last level cache 650 as described earlier.

Figure 7:
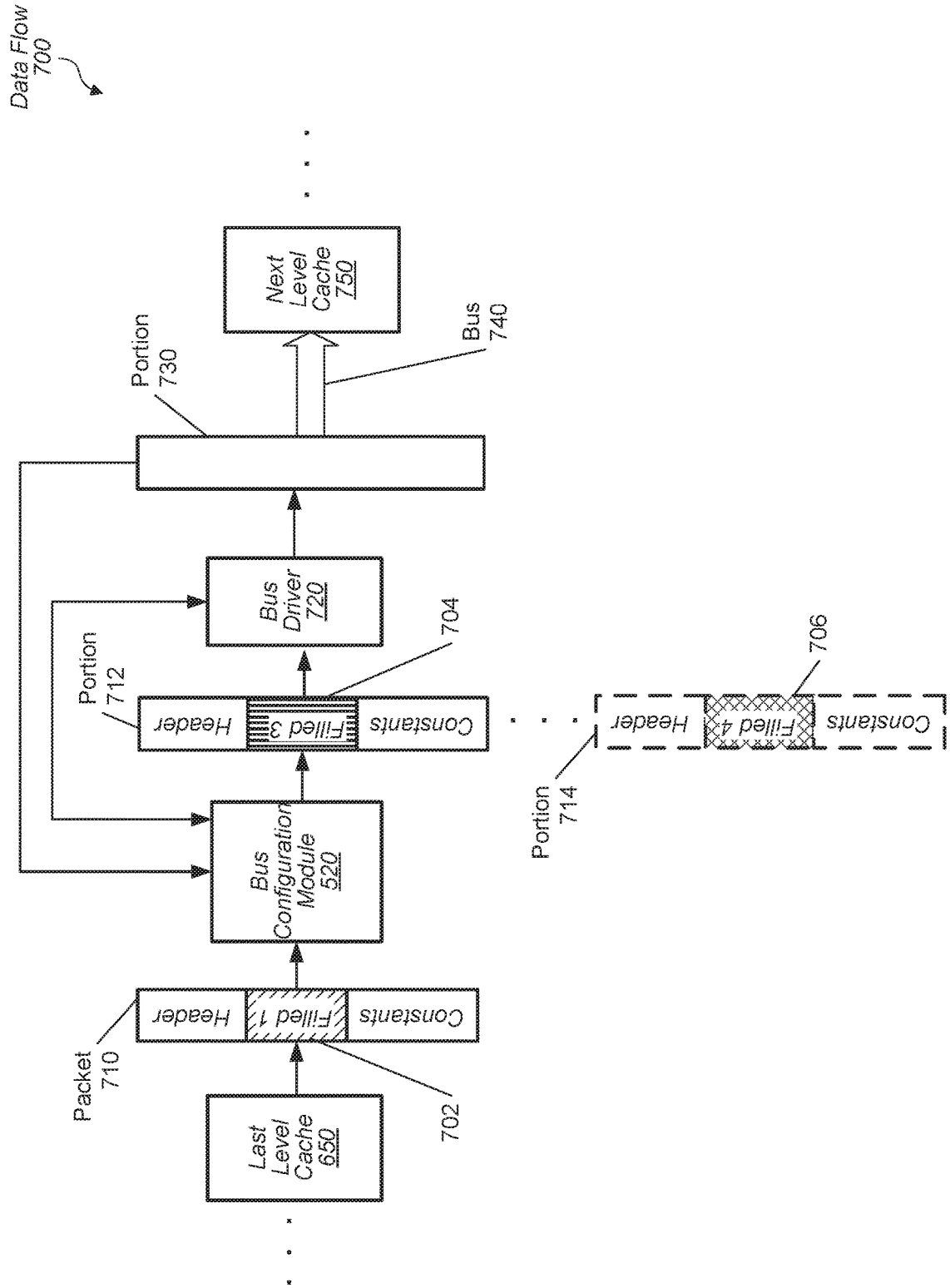
FIG. 7 is a block diagram of another embodiment of a data flow with reduced toggling on a bus.

Referring to FIG. 7, a block diagram of another embodiment of data flow 700 with reduced toggling on a bus is shown. Components and control logic described earlier are numbered identically. In the illustrated embodiment, information is being retrieved from the last-level cache 650 and transmitted to the next level cache 750. For example, in some embodiments, the last-level cache 650 is a level-2 (L2) cache and the next level cache 750 is a level-1 (L1) cache in a hierarchical cache memory subsystem. The data flow 700 is similar to the previous data flow 600. Here, though, the requested data is not compressed again. Rather, power consumption is reduced by use of the bus configuration module 520 identifying the location of the region with filled data 704 within the packet 712 and determining a transmission bus width with the lowest bus toggle rate for the current workload based on one or more factors.

As described earlier, the transmission of data from the last-level cache 650 to the next level cache 750 uses one or more of a bus architecture, a crossbar-based architecture, a network-on-chip (NoC) communication subsystem, a silicon interposer, a TSV in a 3D IC, and so on. If the packet 710 is divided into portions, the resulting portions 712 and 714 are sent to the bus driver 720. Although two portions are shown, any number of portions are possible for dividing the packet 710. The bus driver 720 sends either the undivided packet 710 or the portions 712-714 on the bus 740 to the next level cache 750. If the portions 712-714 are sent, data within the most recent sent data, such as portion 730, is used to reduce the bus toggle rate. In various embodiments, other packets are transmitted in an intermingled fashion before and after the portions 712 and 714. Therefore, each of the portion 712 and the portion 714 uses different fill data. For example, the portion 712 uses the filled data 704 and the portion 714 uses the filled data 706. Reconstruction of the packet 710 from the portions 712-714 occurs in the last level cache 650 as described earlier. In various embodiments, the transmission of the requested data continues past the next level cache 750 until the requesting processor receives the data. During the transmission, in various embodiments, the bus configuration module 520 is used again to reduce the bus toggle rate which also reduces the power consumption for the data transmission.

Figure 8:
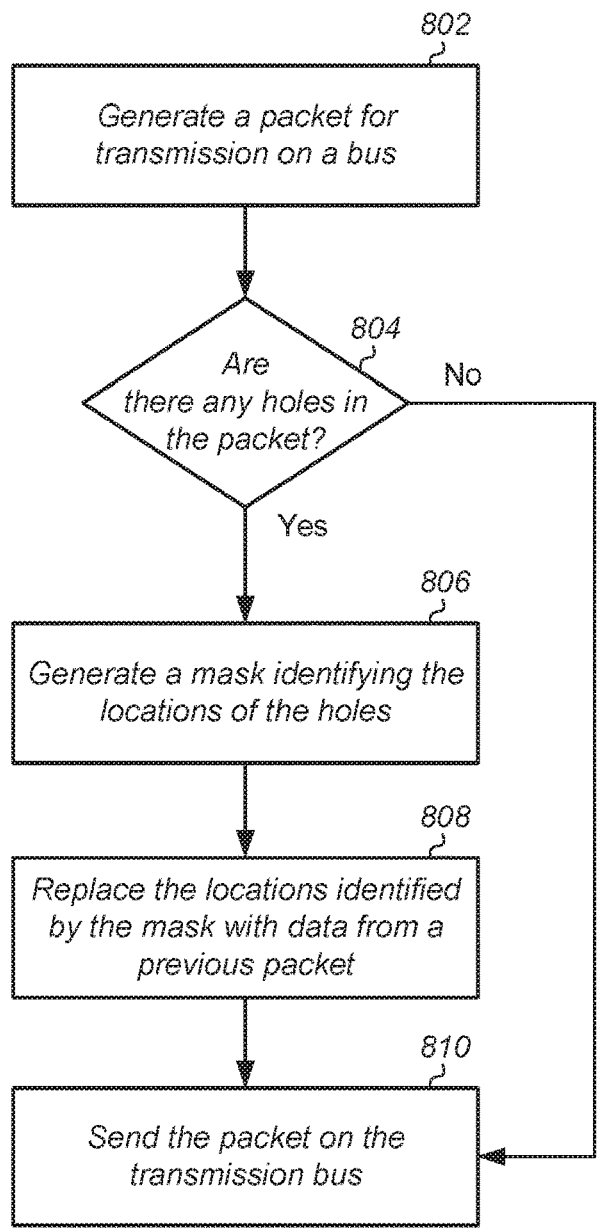
FIG. 8 is a flow diagram illustrating one embodiment of a method for reducing the toggle rate on a bus based on holes produced by a data compression technique.

Referring now to FIG. 8, one embodiment of a method 800 for reducing the toggle rate on a bus based on holes produced by a data compression technique is shown. For purposes of discussion, the steps in this embodiment (as well as in FIGS. 9 and 10) are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 800 (as well as methods 900 and 1000).

A packet is generated for transmission on a bus (block 802). As described earlier, the packets may be flow control units which are subsets of larger network packets. Flits generally carry control information, such as header and tail information for the larger packet, or data, such as the payload of the larger packet. In various embodiments, the generated packet is compressed using any one of a variety of data compression algorithms. If there are any holes in the packet ("yes" leg of the conditional block 804), then a mask is generated identifying the locations of the holes (block 806).

The locations identified by the mask are replaced with data from a previous packet (block 808). In some embodiments, the data used for replacement is from the most recent packet transmitted on the bus prior to the current packet. The packet is sent on the transmission bus (block 810). If there no holes in the packet ("no" leg of the conditional block 804), then control flow of method 800 moves to block 810 where the packet is sent on the bus.

Figure 9:
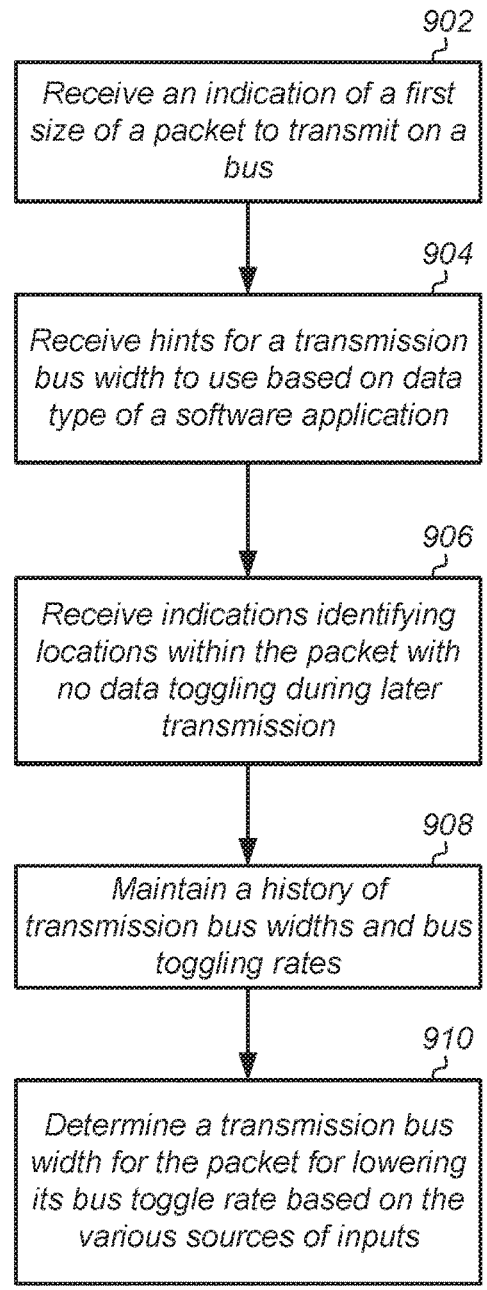
FIG. 9 is a flow diagram illustrating one embodiment of a method for changing the bus width based on a variety of factors.

Turning now to FIG. 9, one embodiment of a method 900 for changing the bus width based on a variety of factors is shown. An indication is received of a size of a packet to transmit on a bus (block 902). Hints are received for a transmission bus width to use based on a data type of a software application (workload) being processed (block 904). In some embodiments, the hints are from software. In other embodiments, the hints are from a hardware monitor identifying data types based on the frequencies of use of particular functional units. In yet other embodiments, a combination of hints from software and hardware are used.

In the example shown, indications are received identifying locations within the packet with no data toggling during later transmission (block 906). For example, a mask is received from a masked packet adjustor as described earlier. In some embodiments, a history is maintained of transmission bus widths and bus toggling rates (block 908). In some embodiments, a table stores relationships between workloads, transmission bus widths, and bus toggling rates. As described earlier, in some embodiments, designers in a simulation or real environment find bus toggle rates for different applications and/or types of workloads. For example, test benches may be run using database applications, scientific applications, video processing, and so on. Based on the test benches, bus toggle rates may be observed and stored in association with the corresponding application and/or data type in a table or other data structure. In various embodiments, the table is updated over time based on observations of bus toggle rates at run time in production environments. Using data from the table, a transmission bus width is determined for the packet in order to lower the bus toggle rate (block 910). In some embodiments, various factors may be weighted in different ways to determine the transmission bus width. In other embodiments, different sets of one or more inputs (factors) are used at a given time. Other combinations of the inputs are possible and contemplated.

Figure 10:
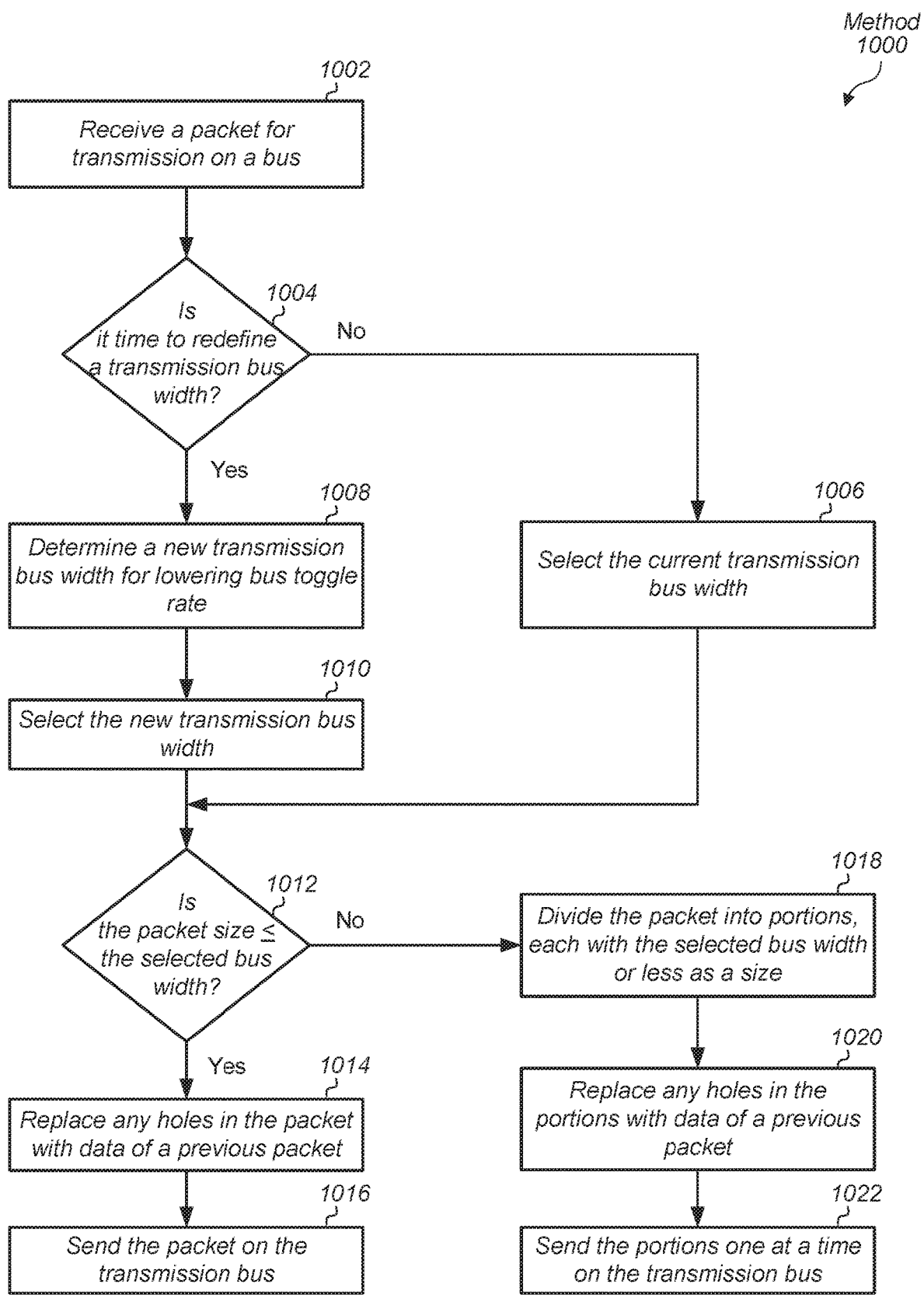
FIG. 10 is a flow diagram illustrating another embodiment of a method for reducing the toggle rate on a bus.

Turning now to FIG. 10, one embodiment of a method 1000 for reducing the toggle rate on a bus is shown. A packet is received for transmission on a bus (block 1002). In various embodiments, a time to redefine a transmission bus width is determined based on one or more of determining a given duration of time has elapsed, determining a current bus toggling rate is above a threshold, and receiving hints indicating a particular data type of a software application (workload) being processed or a different data type than a current data type. If it is not yet time to redefine a transmission bus width ("no" leg of the conditional block 1004), then the current transmission bus width is selected as the bus width to use for data transmission on the bus (block 1006). If it is time to redefine a transmission bus width ("yes" leg of the conditional block 1004), then a new transmission bus width is determined for lowering bus toggle rate (block 1008) using any one of the manners described earlier such as using the bus width power reducer. The new transmission bus width is selected as the bus width to use for data transmission on the bus (block 1010).

If the packet size is less than or equal to the selected bus width ("yes" leg of the conditional block 1012), then any holes in the packet are replaced with data of a previous packet (block 1014). The packet is sent on the transmission bus (block 1016). If the packet size is greater than the selected bus width ("no" leg of the conditional block 1012), then the packet is divided into portions, each with the selected bus width or less as a size (block 1018). Any holes in the portions are replaced with data of a previous packet (block 1020). Following, the portions are sent one at a time on the transmission bus (block 1022).

As described earlier, in some embodiments, the packet being generated and transmitted is a flit, which is a subset of a larger network packet. Although the data for transmission in the above descriptions are packets routed in a network, in other embodiments, the data for transmission is a bit stream or a byte stream in a point-to-point interconnect. In such embodiments, a data provider is used in place of a packet provider where the data provider generates data for transmission on the bus. The bus driver and the bus receiver are replaced with a data driver and a data receiver, and thus, a transmission header with source information, destination information and routing information is not used. Accordingly, control logic for generating and analyzing this information in a transmission header is not used in either of the data driver or the data receiver. However, an indication of the locations of the holes being transmitted with the data is provided on the bus. The data driver transmits this indication and the data receiver uses this indication for locating the new data which is received and for assembling data from multiple received portions.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A computing system, comprising:
a bus driver configured to drive data on a bus;
a data provider configured to provide data for transmission on the bus; and
a bus configuration module configured to:
receive first data from the data provider;
determine a first bus width for transmitting the first data, wherein the first bus width is smaller than a width of the bus to be used for transmitting, wherein the first bus width is selected based on a previously determined correlation between the first bus width and at least one of a bus toggling rate and power consumption;
wherein to determine the first bus width, the bus configuration module is further configured to:
maintain a history of transmission bus widths and bus toggling rates; and
select a bus width with a lowest bus toggling rate.

2. The computing system as recited in claim 1, wherein in response to determining that a size of the first data is not greater than the first bus width, the bus configuration module is further configured to:
fill one or more holes in the first data with information from second data which is most recent data transmitted on the bus prior to the first data at a position corresponding to the one or more holes; and
send the first data to the bus driver for transmission on the bus.

3. The computing system as recited in claim 1, wherein to determine the first bus width, the bus configuration module is further configured to receive hints indicating a data type being processed.

4. The computing system as recited in claim 2, wherein the second data used for filling the one or more holes is from locations within the second data that correspond to locations within the first data storing the one or more holes.

5. The computing system as recited in claim 2, wherein:
the first data is included in a first packet and the second data is included in a second packet; and
the locations of the holes are identified by a header in the first packet.

6. The computing system as recited in claim 1, wherein in response to determining that a size of the first data is greater than the first bus width, the bus configuration module is configured to:
divide the first data into a plurality of portions, each of the plurality of portions having a size no greater than the first bus width;
fill one or more holes in one or more of the plurality of portions with information from second data which is most recent data transmitted on the bus prior to the first data at a position corresponding to the one or more holes, wherein holes comprise invalid data within the first data; and
send the plurality of portions to the bus driver for transmission on the bus.

7. The computing system as recited in claim 1, wherein prior to determining a new bus width, the bus configuration module is configured to determine whether a condition for setting a new bus width is satisfied based on one or more of:
determining a current bus toggling rate is above a threshold;
receiving hints indicating a data type being processed; and
determining a given duration of time has elapsed.

8. A method, comprising:
receiving first data from a data provider configured to provide data for transmission on a bus;
determining a first bus width for transmitting the first data, wherein the first bus width is smaller than a width of the bus to be used for transmitting the first data, wherein the first bus width is selected based on a previously determined correlation between the first bus width and at least one of a bus toggling rate and power consumption;
wherein determining the first bus width comprises:
maintaining a history of transmission bus widths and bus toggling rates; and
selecting a bus width with a lowest bus toggling rate.

9. The method as recited in claim 8, wherein in response to determining that a size of the first data is not greater than the first bus width, the method comprises:
filling one or more holes in the first data with information from second data which is most recent data transmitted on the bus prior to the first data at a position corresponding to the one or more holes; and
sending the first data to the bus driver for transmission on the bus.

10. The method as recited in claim 8, wherein to determine the first bus width, the method further comprises receiving hints indicating a data type being processed.

11. The method as recited in claim 9, wherein the second data used for filling the one or more holes is from locations within the second data that correspond to locations within the first data storing the one or more holes.

12. The method as recited in claim 9, wherein:
the first data is included in a first packet and the second data is included in a second packet; and
the locations of the holes are identified by a header in the first packet.

13. The method as recited in claim 9, wherein in response to determining that a size of the first data is greater than the first bus width, the method comprises:
dividing the first data into a plurality of portions, each of the plurality of portions having a size no greater than the first bus width;
filling one or more holes in one or more of the plurality of portions with information from second data which is most recent data transmitted on the bus prior to the first data at a position corresponding to the one or more holes, wherein holes comprise invalid data within the first data; and
sending the plurality of portions to the bus driver for transmission on the bus.

14. The method as recited in claim 8, wherein prior to determining a first bus width, the bus configuration module is further configured to determine whether a condition for setting a first bus width is satisfied based on one or more of:
determining a current bus toggling rate is above a threshold;
receiving hints indicating a data type being processed; and
determining a given duration of time has elapsed.

15. A bus configuration module, comprising:
a first interface for receiving first data;
a second interface for sending processed data to a bus driver configured to drive data on the bus; and
control circuitry configured to:
determine a first bus width for transmitting first data, wherein the first bus width is smaller than a width of the bus to be used for transmitting, wherein the first bus width is selected based on a previously determined correlation between the first bus width and at least one of a bus toggling rate and power consumption,
wherein to determine the first bus width, the control circuitry is further configured to:
maintain a history of transmission bus widths and bus toggling rates; and
select a bus width with a lowest bus toggling rate.

16. The bus configuration module as recited in claim 15, wherein in response to determining that a size of the first data is not greater than the first bus width, the control circuitry is further configured to:
fill one or more holes in the first data with information from second data which is most recent data transmitted on the bus prior to the first data at a position corresponding to the one or more holes; and
send the first data via the second interface.

17. The bus configuration module as recited in claim 15, wherein for determining the first bus width, the control circuitry is further configured to receive hints indicating a data type being processed.

18. The bus configuration module as recited in claim 15, wherein prior to determining a first bus width, the bus configuration module is configured to determine whether a condition for setting a first bus width is satisfied based on one or more of:
determining a current bus toggling rate is above a threshold;
receiving hints indicating a data type of a software application being processed; and
determining a given duration of time has elapsed.

* * * * *